United States Patent [19]
Conley

[11] 3,810,444
[45] May 14, 1974

[54] AUTOMATIC ANIMAL DROPPING PIT CLEANER

[76] Inventor: John L. Conley, 3870 Chino Ave., Chino, Calif. 91710

[22] Filed: May 12, 1971

[21] Appl. No.: 142,518

[52] U.S. Cl. ............................................... 119/22
[51] Int. Cl. ........................................... A01k 31/04
[58] Field of Search ...................... 119/22; 198/224

[56] References Cited
UNITED STATES PATENTS

| 3,458,029 | 7/1969 | Allen et al. | 198/224 |
| 3,409,120 | 11/1968 | Van Huis | 198/224 |
| 2,294,025 | 8/1942 | Dagg | 119/22 |
| 2,448,120 | 8/1948 | Petraske | 119/22 |

Primary Examiner—Hugh R. Chamblee
Attorney, Agent, or Firm—Boniard I. Brown

[57] ABSTRACT

An automatic dropping pit cleaner for automated poultry handling systems and other automated animal handling systems. The pit cleaner has scrapers which are driven back and forth along a number of animal dropping pits by an automated driving mechanism to scrape animal droppings and other debris from the pit floors onto a conveyor at one end of the pits. Each scraper has a unique design including rocker shoes removable and rotatably mounted on the ends of a supporting bar to which is attached the scraper driving mechanism and a scraper blade extending between and removably attached to the rocker shoes in such a way that the scraper rocks to scraping position during movement toward the conveyor end of its pit and to retracted position during reverse movement of the scraper. The removable mounting of the rocker shoes permits the latter to be readily replaced when worn. The pit cleaner is designed primarily for use in an automated egg producing poultry handling system.

3 Claims, 6 Drawing Figures

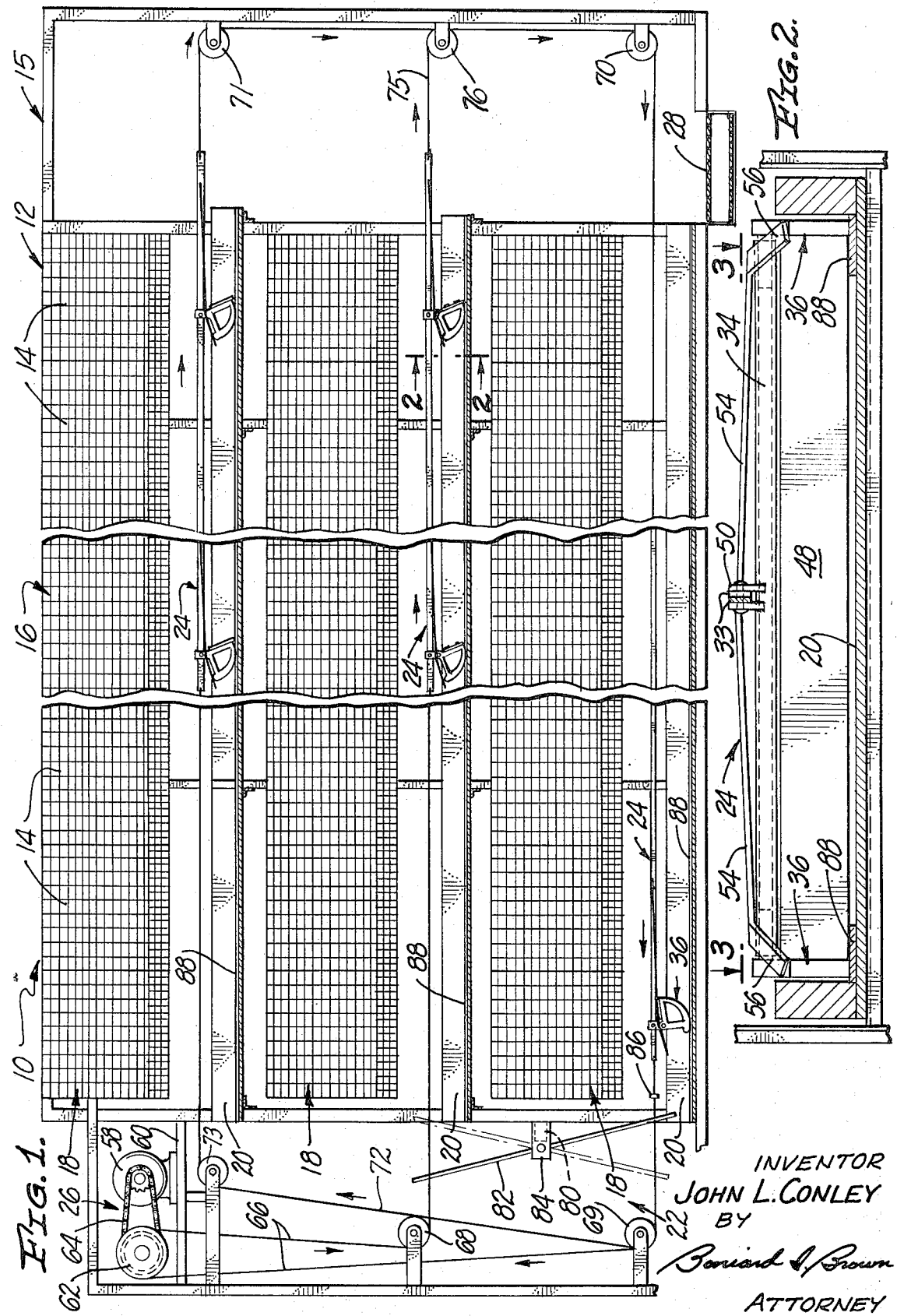

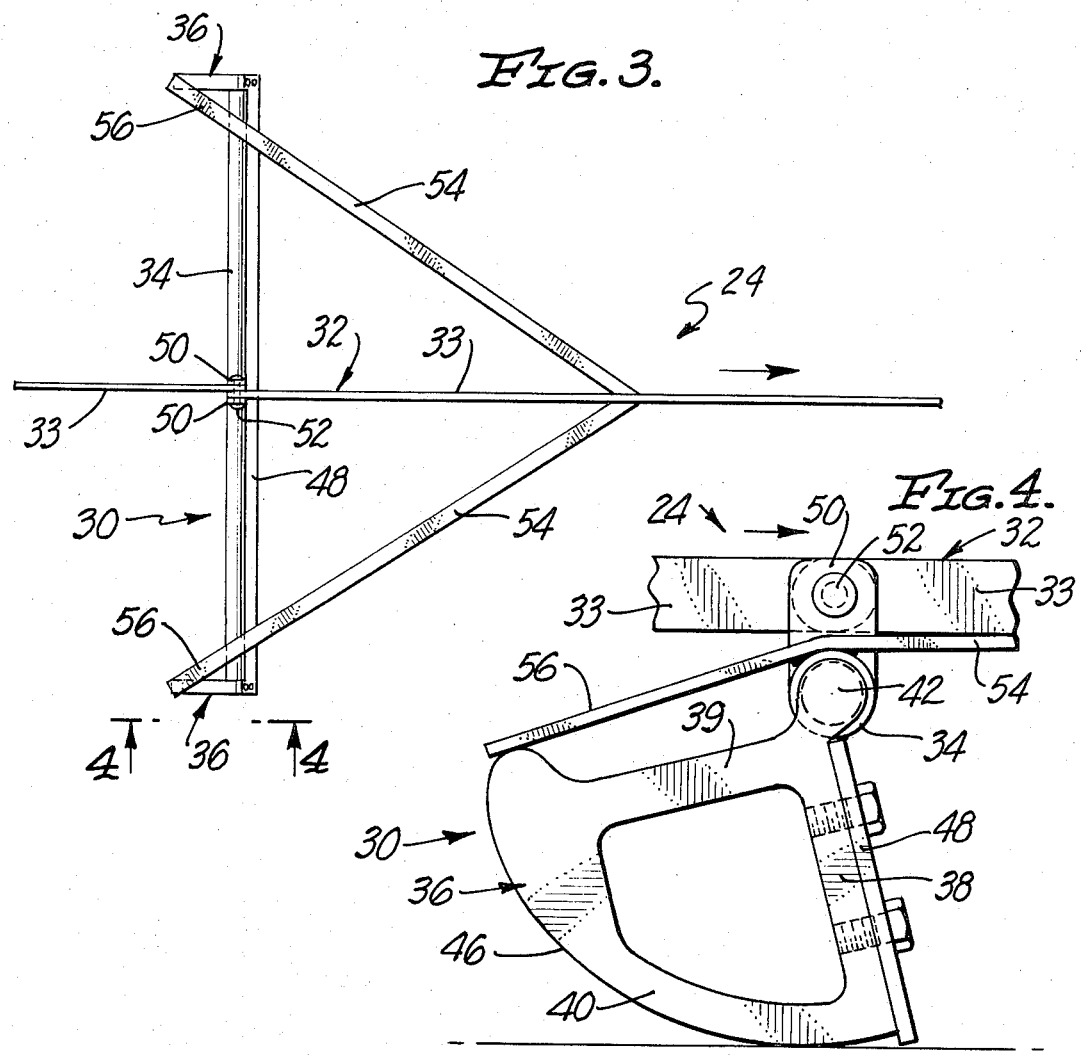
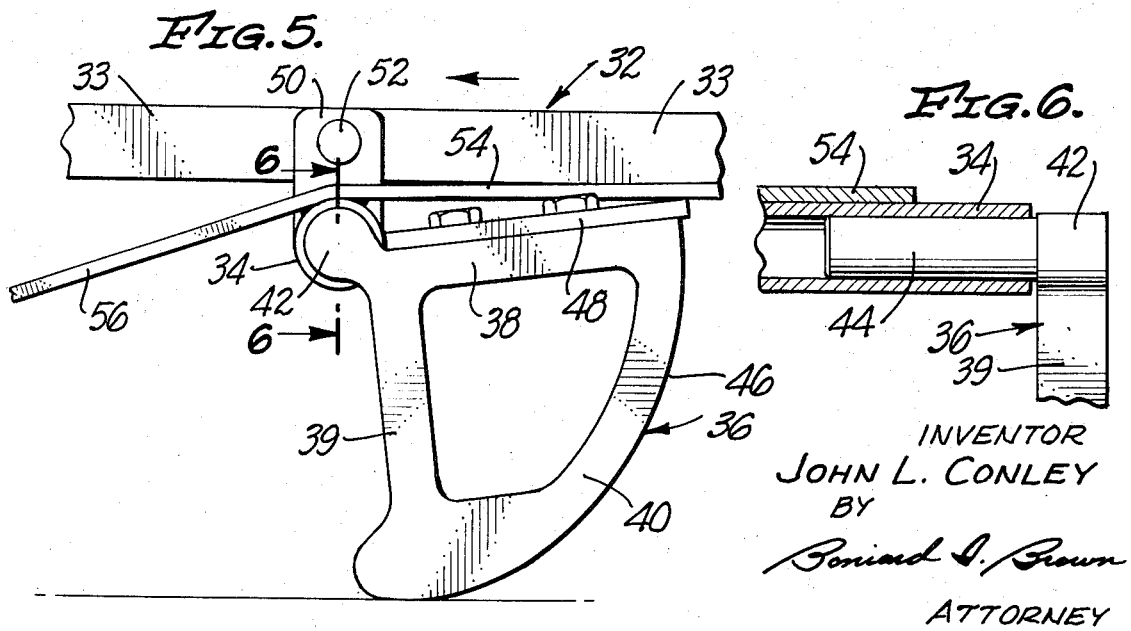

3,810,444

AUTOMATIC ANIMAL DROPPING PIT CLEANER

RELATED APPLICATIONS

Reference is made herein to copending applications Ser. No. 142,519, filed May 12, 1971, and entitled "Automatic Feeder" and Ser. No. 142,511, filed May 12, 1971, and entitled "Automatic Poultry Egg Collector."

BACKGROUND OF THE INVENTION

1. Field of the Invention

This invention relates generally to automated animal handling systems and more particularly to a novel automated animal dropping pit cleaner and a novel pit scraper for such systems.

2. Discussion of the Prior Art

As will appear from the ensuing description, the dropping pit cleaner and scraper of the invention may be employed to advantage in a variety of animal handling systems. However, the pit cleaner and scraper are designed primarily for use in an automated poultry handling system for egg producing poultry and will be described in this connection.

The ever increasing demand for food products requires constant improvements in and automation of food production techniques. This applies to all types of food production including poultry egg production.

The automation of poultry egg production requires an automated poultry handling system including three basic automated components. These components are an automated poultry feeder, an automated poultry egg collector, and an automated poultry litter remover. The earlier mentioned copending applications disclose an improved automated feeder and an improved automated egg collector for an automated poultry handling system. The present invention provides an improved automated dropping pit cleaner for an automated poultry handling system and other animal handling systems.

A variety of automated dropping pit cleaners and other similar refuse removal devices have been devised for poultry and other animal handling systems. In this regard, for example, attention is directed to the following U.S. Pat. Nos. 2,552,743; 2,593,470; 2,675,121; 2,843,086; 3,033,348 and 3,306,435.

SUMMARY OF THE INVENTION

The dropping pit cleaner of the present invention embodies scrapers of unique design which are driven back and forth along a dropping pit by an automated driving mechanism. The scrapers rock to scraping position during motion in one direction and to retracted position during motion in the opposite direction in such a way that litter is scraped from the pit onto a conveyor or other litter receiver at one end of the pit.

The disclosed inventive embodiment is a poultry handling system, specifically an automated handling system for egg producing poultry, which embodies the automatic poultry feeder and egg collector of the earlier mentioned copending applications. In this automated poultry system, the poultry are confined in blocks of poultry cages together constituting a cage battery. Each cage block has two banks of cages arranged back to back with several tiers of cages in each block. Below the two tiers of cages at each tier level of the cage block is a trough-like pit for catching poultry droppings and other litter from the overlying cages. Each dropping pit contains a number of scrapers joined by a tow bar. The scraper driving mechanism is drivably connected to the several scraper tow bars in such a way that the scrapers in the several dropping pits are driven back and forth in unison to scrape litter from the pits onto a disposal conveyor at one end of the cage block. The scrapers are so arranged and their reciprocating motion is so synchronized as to effect a relatively continuous and uniform discharge of litter from the dropping pits onto the disposal conveyor.

An important feature of the invention resides in the unique construction of the pit scrapers. According to this feature, each scraper has a supporting bar for attachment to the scraper tow bar. Removably and rotatably mounted on the ends of the supporting bar are generally quadrant shaped rocker shoes having arcuate edges for contact with the dropping pit floor. Extending between and releasably attached to radial edges of the rocker shoes is a scraper blade.

During movement of the scraper toward the disposal conveyor end of the dropping pit, the scraper rocks to scraping position wherein the ends of the arcuate rocker shoe edges adjacent the scraper blade contact the pit floor to locate the blade in scraping relation to the floor. During reverse movement of the scraper, the latter rocks to retracted position wherein the opposite ends of the arcuate shoe edges contact the pit floor and the scraper blade is elevated above the floor to clear litter on the floor. The rocker shoe edges slide on the dropping pit floor during the reciprocating motion of the scraper and are thus prone to wear. The removability of the shoes permits their rapid replacement when worn.

BRIEF DESCRIPTION OF THE DRAWINGS

FIG. 1 is a side elevation of one cage block of a poultry handling system embodying a dropping pit cleaner according to the invention;

FIG. 2 is an enlarged section taken on line 2—2 in FIG. 1;

FIG. 3 is a view taken on line 3—3 in FIG. 2;

FIG. 4 is an enlarged view taken on line 4—4 in FIG. 3 showing a dropping pit scraper in scraping position;

FIG. 5 is a view similar to FIG. 4 showing the scraper in retracted position, and FIG. 6 is a section taken on line 6—6 in FIG. 5.

DESCRIPTION OF THE PREFERRED EMBODIMENT

The automated poultry handling system 10 illustrated in the drawings has a block 12 of poultry cages 14. In actuality, the poultry handling system will embody a large number of cage blocks making up a cage battery. Cage block 12 has a frame 15 supporting two banks 16 (only one shown) of cages 14 arranged back to back with several tiers 18 of cages in each cage bank. The illustrated cage banks have three cage tiers 18. Below the tiers of cages at each level of the cage block is a trough-like dropping pit 20 for catching poultry droppings and other litter from the cages above. Dropping pits 20 extend the full length of the cage block 12 and have open ends.

Dropping pits 20 are cleaned periodically by the dropping pit cleaner 22 of the present invention. This pit cleaner includes a scraper assembly 24 within each pit 20 and means 26 for driving the scraper assemblies back and forth along the pits. As will appear from the ensuing description, this back and forth motion of the scraper assemblies is effective to scrape litter from the dropping pits to a litter receiver 28 at the right end of the cage block 12 in FIG. 1. The illustrated receiver is a disposal conveyor for transporting the litter to a collection point. This conveyor extends along the entire cage battery for receiving litter from all the cage blocks in the battery.

The scraper assemblies 24 are identical and each comprises a number of scrapers 30 attached to an articulated tow bar 32 having hinged sections 33 with overlapping ends. Each scraper 30 has a supporting bar 34 in the form of a sleeve or tube. At the ends of the supporting bar are generally quadrant-shaped rocker shoes 36. These rocker shoes have generally radial arms 38, 39 joined to one another at their inner ends, and an arcuate, generally circularly curved portion 40 extending between and joining the outer ends of the arms. Joined to the inner ends of the rocker shoe arms 38, 39 are bosses 42 from which journals 44 extend normal to the plane of the shoes. The outer edge 46 of each rocker shoe portion 40 is circularly curved about the axis of the rocker shoe journal 44. Journals 44 fit slidably within the ends of the supporting tube or bar 34 to rotatably and removably support the rocker shoes 36 on the bar. Extending between the rocker shoes is a scraper blade 48. The ends of this blade seat against and are bolted to the outer radial edges of the rocker shoe arms 38. Blade 48 is longitudinally dimensioned to retain the rocker shoe journals 44 on the ends of the supporting bar 34.

Welded or otherwise rigidly attached to the center of the supporting bar 34 are a pair of upstanding tongues 50 which straddle the overlapping ends of a pair of adjacent tow bar sections 33. A rivet 52 extends through the tongues and the overlapping tow bar ends to attach the supporting bar to the tow bar, and pivotally join the tow bar sections. Diagonal braces 54 extend between and are welded or otherwise rigidly joined to one adjacent tow bar section 33 and the outer ends of the supporting bar 34. In this regard, it will be seen that the braces join to the two bar section which extends beyond the blade side of the scraper 30. The direction in which the braces extend from the scraper supporting bar is hereafter referred to as the forward direction of the scraper assembly 24. For reasons to be explained presently, the rear ends 56 of the braces extend rearwardly of the supporting bar over the scraper rocker shoes 36.

The driving means 26 of the dropping pit cleaner 22 comprises a reversible motor 58 mounted on a shelf 60 attached to the cage block frame 15 at the left end of the cage block 12 in FIG. 1. Motor 58 drives a winch 62 through a chain transmission 64. Wound on and fixed at its center to the winch drum is a cable 66, one end of which passes around a pulley 68 and is attached to the rear end of the tow bar 32 of the center scraper assembly 24. The other end of the cable passes around a pulley 69 and is interrupted by and is attached to both ends of the lower scraper assembly, then extends around pulleys 70 and 76 and attaches to the front end of the center scraper assembly. A cable 72 fixed to the rear end of the upper scraper assembly passes around pulleys 73, 69 and attaches to the rear end of the two bar of the lower scraper assembly. Finally, a cable 75 fixed to the front end of the lower tow bar passes around pulleys 70, 76 and attaches to the front end of the tow bar of the center scraper assembly.

It will be seen that the driving means 26 is arranged in such a way that clockwise rotation of winch drum 62 in FIG. 1 drives the center and lower scraper assemblies 24 forwardly and the lower scraper assembly rearwardly. Counterclockwise rotation of the drum drives the upper and center scraper assemblies rearwardly and the lower scraper assembly forwardly. The scraper assemblies are arranged to arrive smultaneously at tne ends of their travel. The scrapers 30 of the scraper assemblies are so spaced that the adjacent scrapers of each assembly have overlapping strokes.

The direction of rotation of motor 58 and hence winch drum 62 is controlled by a reversing switch 80 connected in circuit with the motor. Switch 80 is actuated by a motor reversing lever 82 pivoted at its center on a bracket 84 attached to the left end of the cage block frame 15 midway between the lower and center dropping pits 20. The ends of lever 82 are located in the paths of adjustable stops 86 attached to the cable 66 in positions such that these stops engage and rotate the lever between its full and broken line positions of FIG. 1 at the left-hand limits of travel of the lower and center scraper assemblies 24 to reverse the motor 58.

Referring to FIGS. 2, 4 and 5, the curved portions of the scraper rocker shoes 36 ride on strips 88 secured to the floors of the dropping pits 20 along the sides of the pits. During forward travel of each scraper assembly 24, the friction forces between the rocker shoes of its scrapers 30 and the pit floor strips 88 cause the scrapers to rotate rearwardly to their position of FIG. 4, wherein the rear ends of the shoes abut the overlying rear ends 56 of the assembly braces 54. This position of each scraper is its scraping position. In this scraping position, the lower edge of each scraper blade 48 is located in scraping relation to the floor of its dropping pit 20 to scrape litter from the floor. During reverse or rearward movement of each scraper assembly, its scrapers rotate forwardly to their position of FIG. 5, wherein the scraper blades abut the forward ends of the assembly braces. This position of each scraper is its retracted position. In this retracted position, the scraper blade is elevated well above the dropping pit floor to clear litter on the floor.

It is now evident that during operation of the dropping pit cleaner 22, each of the scraper assemblies 24 is driven back and forth along its dropping pit 20. During forward motion of each scraper assembly toward the right end of its pit in FIG. 1, its scrapers 30 rotate to scraping position to move or scrape litter along the pit toward the right end of the pit. During reverse or rearward motion of each scraper assembly, its scrapers rotate to retracted position to clear litter in the pit. Accordingly, continued reciprocating motion of the scraper assemblies is effective to progressively scrape litter toward and finally from the right ends of the pits onto the disposal conveyor 28 which transports the litter to a disposal point. Because of the reciprocating strokes and reversed directions of adjacent scraper assemblies, litter is discharged onto the disposal conveyor in generally uniform and continuous fashion.

During forward and reverse motion of the scraper assemblies 24, their rocker shoes 36 slide on the dropping pit floor strips 88. According to an important feature of the invention, the shoes are constructed of a material which tends to wear in preference to the floor strips. When a shoe of a scraper 30 becomes excessively worn, it may be easily replaced by removing the adjacent scraper blade mounting screws and sliding the shoe journal 44 from the scraper supporting bar 34. The new shoe is then installed in the supporting bar and secured to the scraper blade 48. As shown best in FIGS. 4 and 5, the rear ends of the scraper rocker shoes are enlarged to increase their life.

What is claimed as new in support of Letters Patent is:

1. A scraper for an animal dropping pit cleaner comprising:
   a supporting bar,
   a pair of generally flat and relatively thin rocker shoes located at the ends and in transverse planes of said bar,
   journals on said shoes rotatably fitted within axial sockets in the ends of said bar rotatably supporting said shoes on said bar for rotation on the longitudinal axis of the bar, and individual removal from the bar,
   said shoes having arcuate poultry pit floor engaging edges generated about said bar axis,
   a scraping blade extending between said shoes in a plane parallel to said axis and disposed at an oblique angle to said shoe edges, and
   means releasably securing said blade to said shoes, whereby during movement of said scraper in a forward direction said shoes and blade rotate to scraping position wherein the ends of said shoe edges adjacent said blade engage the pit floor to locate said blade in scraping relation to the pit floor and during reverse movement of the scraper said shoes and blade rotate to return position wherein the opposite ends of said shoe edges engage the pit floor to locate said blade in an elevated position clear of the floor.

2. An animal dropping pit scraper according to claim 1 wherein:
   said shoes have a generally quadrant shape and radial edges intersecting said floor engaging shoe edges, and
   said blade is secured to said radial shoe edges.

3. An automatic dropping pit cleaner for an automated handling system having a bank of cages containing three tiers with a number of cages disposed side by side in each tier, a generally trough shaped dropping pit below each tier for receiving litter from the overlying cages, and a litter receiver at one end of said cage bank, said pit cleaner comprising:
   a scraper movable along each dropping pit to scrape litter from the pit through the end of the pit adjacent said litter receiver,
   each scraper comprising a supporting bar, a pair of generally flat and relatively thin rocker shoes located at the ends and in transverse planes of said bar, journals on said shoes rotatably fitted within the axial sockets opening through the ends of said bar rotatably supporting said shoes on said bar for rotation on the longitudinal axis of the bar, and individual removal from the bar, said shoes having arcuate poultry pit floor engaging edges generated about said bar axis, a scraping blade extending between said shoes in a plane parallel to said axis and disposed at an oblique angle to said shoe edges, and means releasably securing said blade to said shoes, whereby during movement of said scraper in a forward direction said shoes and blade rotate to scraping position wherein the ends of said shoe edges adjacent said blade engage the pit floor to locate said blade in scraping relation to the pit floor and during reverse movement of the scraper said shoes and blade rotate to return position wherein the opposite ends of said shoe edges engage the pit floor to locate said blade in an elevated position clear of the floor, and
   common means for driving the several scrapers back and forth in unison through their respective dropping pits, said common driving means including cables joining the scrapers of the different tiers in such a way that said scrapers and cables form an endless string wherein said scrapers and cables are arranged in alternate fashion, pulleys on the ends of said cage bank around which said cables pass from tier to tier, and motor driven winch means at one end of said cage bank connected to said string for driving said string in alternately opposite directions to drive each scraper back and forth along its pit.

* * * * *